United States Patent
Hood et al.

(10) Patent No.: US 9,051,438 B2
(45) Date of Patent: Jun. 9, 2015

(54) STYRENE-ACRYLONITRILE COPOLYMER FOAM WITH MINIMAL YELLOWING

(75) Inventors: Lawrence S. Hood, Midland, MI (US); Brian H. Deshano, Sanford, MI (US); David J. Frankowski, Freeland, MI (US)

(73) Assignee: Dow Global Technologies LLC, Midland, MI (US)

( * ) Notice: Subject to any disclaimer, the term of this patent is extended or adjusted under 35 U.S.C. 154(b) by 261 days.

(21) Appl. No.: 13/640,058

(22) PCT Filed: May 4, 2011

(86) PCT No.: PCT/US2011/035085
§ 371 (c)(1),
(2), (4) Date: Oct. 9, 2012

(87) PCT Pub. No.: WO2011/143014
PCT Pub. Date: Nov. 17, 2011

(65) Prior Publication Data
US 2013/0053466 A1  Feb. 28, 2013

Related U.S. Application Data

(60) Provisional application No. 61/334,201, filed on May 13, 2010.

(51) Int. Cl.
| | |
|---|---|
| C08F 220/44 | (2006.01) |
| C08J 9/00 | (2006.01) |
| C08F 6/00 | (2006.01) |
| C08F 212/10 | (2006.01) |
| C08J 9/12 | (2006.01) |
| C08J 9/14 | (2006.01) |

(52) U.S. Cl.
CPC .............. *C08J 9/0061* (2013.01); *C08F 6/003* (2013.01); *C08F 212/10* (2013.01); *C08F 220/44* (2013.01); *C08J 9/125* (2013.01); *C08J 9/146* (2013.01); *C08J 2201/03* (2013.01); *C08J 2203/182* (2013.01); *C08J 2325/12* (2013.01)

(58) Field of Classification Search
CPC ............................. C08J 2325/12; C08J 212/10
See application file for complete search history.

(56) References Cited

U.S. PATENT DOCUMENTS

| | | | |
|---|---|---|---|
| 3,573,152 A | | 3/1971 | Wiley et al. |
| 4,068,064 A | * | 1/1978 | Platt et al. ..................... 526/194 |
| 4,323,528 A | | 4/1982 | Collins |
| 4,420,448 A | * | 12/1983 | Krutchen ........................ 264/53 |
| 4,824,720 A | | 4/1989 | Malone |
| 5,624,982 A | | 4/1997 | Chang et al. |
| 5,905,096 A | | 5/1999 | Lay et al. |
| 2001/0007890 A1 | | 7/2001 | NieSsner et al. |
| 2007/0158976 A1 | * | 7/2007 | Vo et al. .................... 296/187.03 |
| 2008/0139682 A1 | * | 6/2008 | Vo et al. ........................ 521/81 |
| 2008/0300333 A1 | | 12/2008 | Weber et al. |
| 2010/0197819 A1 | * | 8/2010 | Shuler et al. ..................... 521/95 |
| 2011/0118424 A1 | * | 5/2011 | Yamashita et al. ............... 526/64 |

FOREIGN PATENT DOCUMENTS

| | | |
|---|---|---|
| EP | 1496083 | 1/2005 |
| WO | 9515358 | 6/1995 |

OTHER PUBLICATIONS

Allan, D.S., et al., Macromolecules, vol. 26, No. 22 (1993).

* cited by examiner

*Primary Examiner* — Randy Gulakowski
*Assistant Examiner* — Christina Wales
(74) *Attorney, Agent, or Firm* — Steven W. Mork

(57) ABSTRACT

Prepare polymeric foam articles having low yellowing using a styrene-acrylonitrile copolymer that contains less than 145 weight-parts acrylonitrile dimer and less than 8,500 weight-parts acrylonitrile trimer per million weight parts acrylonitrile copolymer.

4 Claims, No Drawings

STYRENE-ACRYLONITRILE COPOLYMER FOAM WITH MINIMAL YELLOWING

CROSS REFERENCE STATEMENT

This application claims the benefit of U.S. Provisional Application No. 61/334,201, filed May 13, 2010, the entire content of which is incorporated herein by reference.

BACKGROUND OF THE INVENTION

1. Field of the Invention

The present invention relates to polymeric foam comprising styrene-acrylonitrile copolymer and a process for preparing such polymeric foam.

2. Description of Related Art

Polymeric foam is useful for many applications including thermal insulation and floral and craft applications. Unlike most thermal insulation applications, most floral and craft foam is desirably white in color. Moreover, floral and craft foam desirably has an average cell size on the order of millimeters in diameter as opposed to thermally insulating foam that benefits from average cell diameters more like 250 microns or less. Large cell sized foam is more difficult to prepare with a white appearance. Small cell diameter foam, such as thermal insulating foam, scatters light more readily than large cell sized floral and craft foam. Scattered light tends to increase a white appearance and can mask discoloration in the polymer matrix of foam. The large diameter cells of floral and craft foam do not scatter light as well so the color of the polymer matrix is more apparent. The large cell size of floral and craft foam makes it particularly challenging to prepare with a white appearance.

Styrene-acrylonitrile (SAN) copolymer has become an increasingly desirable polymer for preparing polymeric foam because it has higher water solubility than polystyrene homopolymer, which means environmentally friendly aqueous blowing agents can be used more readily with SAN copolymer than polystyrene homopolymer. Unfortunately, SAN copolymers are also more susceptible to yellowing than polystyrene homopolymers. Yellowing promotes a sense of impurity, age and degradation in otherwise white foam. This is particularly problematic for floral and craft foam where an especially white foam appearance is necessary. Even minor yellowing becomes noticeable in the large cell sized foam matrix of floral and craft foam. That makes using SAN copolymer particularly challenging for floral and craft applications even though use of an aqueous blowing agent is desirable.

The reason why SAN copolymer yellows more readily than polystyrene homopolymer is not fully understood. One study reports that the yellowing in SAN copolymers is at least partly the result of cyclized AN sequences forming in the copolymer backbone as well as possibly small-molecule (oligomer) residues in the polymer. (see, Macromolecules, Vol. 26, No. 22 (1993)). The same article does not address a solution for avoiding oligomer formation, but does offer suggestions on how to modify its continuous stirred tank reactor (CSTR) process to possibly reduce cyclized AN sequences.

United States patent application 2008/0300333A1 discloses a method for preparing copolymers comprising a combination of three monomers (vinyl aromatic monomer, vinyl cyanides and dicarboxylic anhydrides) and thermoplastic articles made from the copolymers. An objective of these copolymers is to achieve vinyl aromatic copolymers having less intrinsic color.

United States patent application 2001/0007890A1 discloses a styrenic copolymer polymerized in a presence of antioxidants to produce a copolymer having a low level of intrinsic yellow color.

It is desirable to be able to produce a white floral and craft foam of SAN copolymer without having to include dicarboxylic anhydride monomers or polymerize the SAN copolymer in the presence of antioxidants. It would be even more desirable to produce floral and craft foam of SAN copolymer that has less yellowing than achievable only by adding antioxidants.

BRIEF SUMMARY OF THE INVENTION

The present invention provides a solution to the problem of producing a white floral and craft foam of SAN copolymer without having to include dicarboxylic anhydride monomers or polymerize the SAN copolymer in the presence of antioxidants. The present invention achieves this objective by preparing polymeric foam using a SAN copolymer that surprisingly has an inherently low concentration of oligomers. The SAN copolymer is made using a plug flow reactor (PFR), which surprisingly results in low oligomer concentrations. As a result, the process of the present invention can produce SAN copolymer foam for floral and craft applications that is less yellow than even achievable by incorporating antioxidants.

In a first aspect, the present invention is a polymeric foam article comprising a polymer matrix defining cells, the polymer matrix comprising at least 50 weight-percent styrene-acrylonitrile copolymer by weight of the polymer matrix wherein the polymer matrix has an acrylonitrile dimer content of less than 145 weight parts and trimer content of less than 8,500 weight parts, with weight-parts of dimers and trimers based on one million polymer matrix weight parts.

In a second aspect, the present invention is a process for preparing the polymeric foam of the first aspect, the process comprising (a) preparing a foamable polymer composition that comprises a blowing agent and a polymer matrix that includes styrene-acrylonitrile copolymer, the foamable polymer composition being at an initial temperature higher than the softening temperature of the polymer matrix and an initial pressure that precludes foaming of the polymer matrix; and (b) exposing the foamable polymer composition to a pressure below the initial pressure and allowing the polymer matrix to expand into a polymeric foam article; wherein, styrene-acrylonitrile accounts for at least 50 weight-percent of the polymer matrix relative to polymer matrix weight and wherein the polymer matrix contains less than 145 weight parts acrylonitrile dimer and less than 8,500 weight-parts acrylonitrile trimer based on one million weight parts of polymer matrix.

The process of the present invention is useful for preparing the polymeric foam of the present invention. The polymeric foam of the present invention is useful in any polymeric foam application, but serves a particular need for a white floral and craft foam made from SAN copolymer.

DETAILED DESCRIPTION OF THE INVENTION

Test methods refer to the most recent test method as of the priority date of this document unless a date is indicated with the test method number. References to test methods contain both a reference to the testing society and the test method number. Test method organizations are referenced by one of the following abbreviations: ASTM refers to American Society for Testing and Materials; EN refers to European Norm; DIN refers to Deutches Institute fur Normung; and ISO refers to International Organization for Standards.

Foam articles have three mutually perpendicular dimensions: length, width and thickness. The length dimension lies along the longest dimension of a foam article and typically is along the extrusion direction of an extruded foam article. The thickness dimension is the dimension that has the smallest magnitude. Width is mutually perpendicular to length and thickness and can have a magnitude equal to or less than the length and equal to or greater than the thickness.

Average cell size refers to average vertical cell size unless otherwise stated. Vertical cell size is the cell diameter in a direction along the thickness dimension of a foam article. Determine average cell size according to ASTM method D-3576-04.

"And/or" means "and, or as an alternative". All ranges include endpoints unless otherwise indicated.

The polymeric foam article of the present invention comprises a polymer matrix. The polymer matrix comprises at least 50 weight-percent (wt %) styrene-acrylonitrile (SAN) copolymer relative to the total polymer matrix weight. The polymer matrix can comprise 60 wt % or more, 75 wt % or more, 80 wt % or more, even 90 wt % or more SAN copolymer relative to total polymer matrix weight. The polymer matrix can even consist of SAN copolymer.

The SAN copolymer consists of one or more than one type of SAN copolymer. SAN copolymer in the SAN copolymer composition can be block copolymer, a random copolymer, linear, branched or any combination of such types of SAN copolymers. Polymerized acrylonitrile (AN) monomer typically makes up 20 wt % or less, more typically 15 wt % or less based on the total weight of SAN copolymer. Moreover, polymerized AN monomer desirably makes up five wt % or more, preferably ten wt % or more based on the total weight of SAN copolymer. If the concentration of copolymerized AN monomer is below five wt % the SAN copolymer risks having an undesirably low water solubility, which hinders use of aqueous blowing agents.

The SAN copolymer, and hence the polymer matrix, contains less than 145 weight parts of AN dimer and less than 8,500 weight part AN trimer relative to one million polymer matrix weight parts. For simplicity, weight parts per million weight parts polymer matrix shall be referred to as parts per million (ppm). Preferably, the SAN copolymer and polymer matrix both contain 120 ppm or less, still more preferably 100 ppm or less, yet more preferably 80 ppm or less AN dimer. "AN dimer" is a molecule composed of one AN and one styrene monomeric unit. At the same time, the SAN copolymer and polymer matrix both preferably contain 8,000 ppm or less, still more preferably 7,500 ppm or less and yet more preferably 7,000 ppm or less AN trimer. "AN trimer" is a molecule composed of three monomeric units in which there exists at least one styrene monomer unit and at least one AN monomer unit. Without being bound by theory, the low levels of AN dimers and trimers may account for the extremely low yellowing in the SAN polymer and the present polymeric foam article. The SAN copolymer surprisingly contains these levels of AN dimer and trimer directly upon manufacture.

A discovery leading to the present invention lies in identifying a method of manufacturing SAN copolymer in a continuous manner yet in a way to produce SAN copolymer having the aforementioned levels of AN dimer and trimer. Applicants have discovered that producing SAN using a plug flow reactor (PFR) train are less yellow and can produce a polymeric foam, including a polymeric foam for floral and craft applications, that has a surprisingly low level of yellow discoloration. In fact, Applicants have found that by using the SAN copolymer manufactured in this manner produces polymeric foam with less yellowing than even using an antioxidant with typical SAN copolymers.

Determine the amount of dimers and trimers in an SAN sample using the following procedure. Dissolve a known amount of sample in dichloromethane that contains a known amount of n-butylbenzene as an internal standard. Precipitate bulk polymer by adding methanol to leave behind polymer extract in dichloromethane with the n-butylbenzene standard. Analyze the extract by capillary gas chromatography using a flame ionization detector and a 50 meter by 0.32 millimeter internal diameter fused silica capillary coated with 0.17 micrometers of cross-linked methylsilicone liquid phase. Quantify dimer and trimer components by measuring their peak area relative to the peak area of the internal standard. Calibration of the quantitative analysis procedure is done using styrene dimer (S-S) and trimer (S-S-S) references collected from a continuous styrene polymerization reaction using a partial condenser on a vacuum devolatilization tank vapor stream and isolated by means of molecular weight fractionation using gel permeation chromatography. Use the following response factor ($R_f$) correlations to correlate styrene dimers and trimers to the dimers and trimers of interest in SAN:

$$R_{f(AN-S)} = 1.10 \times R_{f(S-S)}$$

$$R_{f(AN-AN-S)} = 1.15 \times R_{f(S-S-S)}$$

$$R_{f(AN-S-S)} = 1.06 \times R_{f(S-S-S)}$$

In an PFR process one or more fluid reagents are pumped through a pipe or tube. The chemical reaction between reagents proceeds as the reagents travel through the pipe or tube. The temperature along the tube gradually increases as the reagents travel down the tube in order to limit the extent of polymer chains that are initiated at any given time. In this type of reactor, the changing reaction rate along the tube creates a gradient in extent of reaction with respect to distance traversed in the tube. At the inlet to the tube the reaction rate is high but as the reagents become consumed and the concentration of products increases the reaction rate slows. The PFR process can benefit from addition of reagents at numerous locations along the tube reactor in order to achieve a higher percent completion than, for example, continuously stirred tank reactors while maintaining desired polymer molecular properties. A higher reaction conversion and higher reactor exit temperature typical of the PFR process versus the CSTR process enables more efficient devolatilization. Better devolatilization and lower amounts of thermal initiation typical of the PFR process can produce SAN copolymer product with few oligomers.

The present invention is a result of discovering that a particularly low level of AN dimers and trimers are achievable by the PFR process and that using an SAN copolymer with low dimers and trimers from the PFR process a floral and craft foam with little if any yellowing is possible. The low level of dimers and trimers in the SAN and polymer matrix of the present invention are characteristics of obtaining the SAN from an PFR process.

The PFR process is in contrast to, for example, a continuously stirred tank reactor (CSTR) process such as that disclosed in the *Macromolecules* article cited in the Background (Macromolecules, Vol. 26, No. 22 (1993)). In a CSTR process one or more fluid reagents are introduced into a tank reactor equipped with an impeller while the reactor effluent is removed. The impeller stirs the reagents to ensure proper mixing as reagents react. CSTR processes are typically run at higher polymerization temperature than PFR reactions.

Higher polymerization reactions result in greater thermal initiation, which in turn produces more dimers and trimers and other oligomers. It is also more difficult to remove oligomers from CSTR product using vacuum due to the high concentration of unreacted monomer and solvent that are typical of the CSTR process. As a result, the final product from a CSTR reaction is typically left with much higher dimers and trimers than product from the present PFR process.

If the polymer matrix is less than 100 wt % SAN copolymer, other polymer that can be present include alkenyl aromatic polymers such as polystyrene homopolymers and polystyrene copolymers. In one desirable embodiment, the polymer matrix comprises up to 50 wt %, preferably up to 40 wt %, and can contain up to 25 wt %, or up to 20 wt %, or up to 10 wt %, or just up to 5 wt % alkenyl aromatic polymers other than SAN copolymer. Typically, the alkenyl aromatic polymer other than SAN copolymer in these possible compositions is a polystyrene homopolymer or copolymer, more typically polystyrene homopolymer.

The polymer matrix defines a plurality of cells and thereby forms a foam article. The foam article can have any average cell size within the broadest scope of the present invention. However, particularly valuable foam articles of the present invention have an average cell size of one millimeter or greater, preferably 1.3 millimeters or greater and still more preferably two millimeters or greater because these cell sizes are particularly desirable for floral and craft applications and are particularly susceptible to visible yellowing. Generally, the average cell size is ten millimeters or less.

The polymeric foam article also desirably has a density of 40 kilograms per cubic meter ($kg/m^3$) or less, preferably 32 $kg/m^3$ or less and can be 30 $kg/m^3$ or less or even 28 $kg/m^3$ or less. Generally, the polymeric foam article has a density of 15 kg/m3 or more in order to maintain structural integrity during handling. Determine density according to ASTM method D-1622-08.

Extent of yellowing in a polymeric foam can be characterized using spectroscopic methods, and in particular by the composite transmittance index (CTI) of the foam. Determine CTI for a foam article by dissolving 1.5 grams of the polymeric foam article in 20 milliliters of toluene. Allow sufficient time for the foam portion to dissolve in the toluene. Introduce the resulting foam/toluene solution into a clean spectroscopic cuvette. Measure the percent-transmittance (% T) through the sample at wavelengths from 180 nanometers to 880 nanometers using a spectrometer (for example, a USB4000 spectrometer from Ocean Optics). Calculate the CTI by integrating the % T curve for the foam/toluene sample over the wavelength region and dividing by integrating the same curve assuming 100% transmittance over the entire curve:

$$\text{Composite Transmittance Index } (CTI) = \frac{\int_{380\,nm}^{500\,nm} \%\,T\,d\lambda}{\int_{380\,nm}^{500\,nm} d\lambda}$$

Higher CTI values correspond to less yellow and a more white-appearing foam. The solution characterization method above characterizes how white the polymer is apart from any interference in evaluation due to differences in foam cell size, cell structure or surface texture. Whiter polymer is likely to produce whiter foam of the same foam physical properties as less white polymer.

Software packages suitable for conducting the integration include KaleidaGraph™ (KaleidaGraph is a trademark of Abelbeck, Lonnie R. DBA Abelbeck Software) published by Synergy Software, particularly the macro "Integrate-Area" within that software package.

Polymeric foam articles of the present invention desirably have a CTI of 60% or greater, preferably 70% or greater and still more preferably 80% or greater. Higher CTI index values correspond to white appearing foam articles.

To be clear, it is anticipated that polymeric foam articles of the present invention can have any combination of desirable and preferred values for characteristics described herein. For example, any combination of a polymeric foam article can have any of the density values while having any of the average cell size values and any of the CTI values.

Foam articles of the present invention can also include any one or any combination of more than one additive. Suitable additives include infrared attenuating agents (for example, carbon black, graphite, metal flake, titanium dioxide); clays such as natural absorbent clays (for example, kaolinite and montmorillonite) and synthetic clays; nucleating agents (for example, talc and magnesium silicate); flame retardants (for example, brominated flame retardants such as hexabromocyclododecane and brominated polymers, phosphorous flame retardants such as triphenylphosphate, and flame retardant packages that may including synergists such as, or example, dicumyl and polycumyl); lubricants (for example, calcium stearate and barium stearate); and acid scavengers (for example, magnesium oxide and tetrasodium pyrophosphate).

Of particular value, the foam articles of the present invention can achieve the desirably and even preferred CTI values even when they include brominated flame retardant additives.

Prepare the polymeric foam article of the present invention by the process of the present invention. The first step of the process of the present invention includes preparing a foamable polymer composition that comprises a polymer matrix and a blowing agent.

The polymer matrix is as described above for the polymeric foam article of the present invention. At least 50 wt % of the polymer matrix is SAN copolymer, based on total polymer matrix weight. Desirably, the first step of the process includes providing an SAN copolymer prepared by an PFR process so as to have the above-described desirable and preferred levels of AN dimer and trimers. As mentioned above, the polymer matrix contains less than 145 ppm AN dimer and less than 8,500 ppm AN trimer.

Blowing agents suitable for use in the present invention include one or more than one of the following: inorganic gases such as carbon dioxide, argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); fully and partially halogenated polymers and copolymers, desirably fluorinated polymers and copolymers, even more preferably chlorine-free fluorinated polymers and copolymers; aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

Particularly desirable are aqueous blowing agents, which are blowing agents that include water. For the process of the present invention, water is generally present at a concentration of up to 1.5 wt %, typically up to 1.2 wt %. At the same time, water is preferably present at a concentration of 0.5 wt % or more, more preferably 0.75 wt % or more in order to maximize use of ecologically friendly water as a blowing agent.

Particular embodiments include any of the following blowing agent compositions: (a) 1,1-diflouroethane (HFC-152a) and water; (b) 1,1,1,2-tetrafluoroethane (HFC-134a), HFC-152a and water; and (c) either (a) or (b) in combination with carbon dioxide.

The foamable polymer composition is initially at an initial temperature that is higher than the softening temperature of the polymer matrix and at an initial pressure that precludes foaming of the polymer matrix. The softening temperature of the polymer matrix is a temperature at which the polymer matrix is at or above the melt temperature for all crystalline polymers that form a continuous phase in the polymer matrix and at or above the glass transition temperature for all the amorphous polymers in that form a continuous phase in the polymer matrix. Polymers "form a continuous phase" if they are miscible with a continuous polymer phase in the matrix.

When the foamable polymer composition is at the initial temperature it is capable of non-destructively expanding with expansion of the blowing agent to form a cellular material. Therefore, the initial pressure of the foamable polymer composition is high enough so as to preclude foaming. The actual value of the initial pressure will depend on the composition of the blowing agent.

The second step of the process is exposing the foamable polymer composition to a pressure below the initial pressure and allowing the polymer matrix to expand into a polymeric foam article, the polymeric foam article being a polymeric foam article of the present invention as described above.

The process of the present invention can, for example, be an extrusion foam process or an expanded bead foam process.

In an expanded bead foam process prepare a foamable composition by incorporating a blowing agent into granules of polymer composition (for example, imbibing granules of polymer composition with a blowing agent under pressure). Subsequently, expand the granules in a mold to obtain a foam composition comprising a multitude of expanded foam beads (granules) that adhere to one another to form a "bead foam". Pre-expansion of the independent beads is also possible followed by a secondary expansion within a mold. As yet another alternative, expand the beads apart from a mold and then fuse them together thermally or with an adhesive within a mold.

Bead foam has a characteristic continuous network of polymer bead skins that encapsulate collections of foam cells within the foam. Polymer bead skins have a higher density than cell walls within the bead skins. The polymer bead skins extend in multiple directions and connect any foam surface to an opposing foam surface, and generally interconnect all foam surfaces. The polymer bead skins are residual skins from each foam bead that expanded to form the foam. The bead skins coalesce together to form a foam structure comprising multiple expanded foam beads. Bead foams tend to be more friable than extruded foam because they can fracture along the bead skin network. Moreover, the bead skin network provides a continuous thermal short from any one side of the foam to an opposing side, which is undesirable in a thermal insulating material.

Polymeric foam articles of the present invention are desirably extruded polymeric foam articles.

An extrusion foam process comprises providing a foamable composition in an extruder and then expelling the foamable composition into a lower pressure environment through a foaming die to initiate expansion of the foamable composition into a thermoplastic polymer foam. The extrusion process can be continuous or semi-continuous (for example, accumulative extrusion). In a general extrusion process, prepare a foamable composition of a thermoplastic polymer with a blowing agent in an extruder by heating a thermoplastic polymer composition to soften it, mixing a blowing agent composition together with the softened thermoplastic polymer composition at a mixing temperature and pressure that precludes expansion of the blowing agent to any meaningful extent (preferably, that precludes any blowing agent expansion) and then expelling the foamable composition through a die into an environment having a temperature and pressure below the mixing temperature and pressure. Upon expelling the foamable composition into the lower pressure the blowing agent expands the thermoplastic polymer into a thermoplastic polymer foam. Desirably, cool the foamable composition after mixing and prior to expelling it through the die. In a continuous process, expel the foamable composition at an essentially constant rate into the lower pressure to enable essentially continuous foaming.

Accumulative extrusion is a semi-continuous process that comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone having a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam. U.S. Pat. No. 4,323,528, herein incorporated by reference, discloses such a process in a context of making polyolefin foams, yet which is readily adaptable to aromatic polymer foam.

Coalesced foam processes are also suitable embodiments of the present extrusion process. U.S. Pat. No. 3,573,152 and U.S. Pat. No. 4,824,720 (the teachings of both are incorporated herein by reference) contain descriptions of coalesced foam processes. In general, during a coalesced foam process a foamable polymer composition extrudes through a die containing multiple orifices oriented such that when the foamable polymer composition expands upon extrusion the resulting strands of foaming polymer contact one another and partially coalesce together. The resulting foam ("strand foam") is a composition of foam strands extending in the extrusion direction of the foam. A skin typically defines each strand in the coalesced foam. While coalesced foam processes are suitable, the process can be free of forming independent foam strands and then subsequently fusing the strands together to foam a stand foam.

Extruded polymeric foam articles are distinct from expanded polymer bead foam articles by being free from encapsulated collections of beads. While a strand foam has a skin similar to bead foam, the skin of a strand foam does not fully encapsulate groups of cells but rather forms a tube extending only in the extrusion direction of the foam. Therefore, the polymer skin in strand foam does not extend in all directions and interconnect any foam surface to an opposing surface like the polymer skin in an expanded polymer bead foam.

Examples

The following examples illustrate embodiments of the present invention as well as comparative examples that fall outside the scope of the present invention.

Prepare polymeric foam articles from using the following five SAN copolymer resins:

TABLE 1

| Resin | wt % AN | Mn | Mw | Mw/Mn | AN Dimers (ppm) | AN Trimers (ppm) |
|---|---|---|---|---|---|---|
| CSTR (1) | 15.6 | 53.4 | 122 | 2.28 | 323 | 11,172 |
| CSTR (2) | 15.9 | 65.8 | 145 | 2.21 | 148 | 8,861 |
| PFR (1) | 15.7 | 53 | 119 | 2.25 | 69 | 7,027 |
| PFR (2) | 15.8 | 58.3 | 132 | 2.27 | 61 | 6,612 |
| PFR (3) | 16.1 | 65.2 | 143 | 2.2 | 56 | 6,550 |

Determine dimer and trimer concentrations according to the afore-described process. Weigh 1.00+/−0.10 gram of polymer sample into a 50 milliliter vial. Add 10.0 milliliters of internal standard solution (100 milligrams of n-butylbenzene in one liter of dichloromethane). Close the vial with a septum and snap cap. Shake until dissolution is complete. Remove the cap and septum and add 15 milliliters of methanol. Close with a septum and cap once again and shake vigorously for one minute. The polymer will precipitate and coagulate. Remove a few milliliters of the liquid in the vial using a 10-milliliter syringe. Connect a 0.5 micrometer Millex-LCR filter to the syringe and filter the solution into an autosampler vial. Close the vial with a septum and cap. Analyze two microliters of the solution in the autosampler vial.

Prepare CSTR(1) and CSTR(2) using a continuously stirred tank reactor. Continuously add a monomer feed stream into continuously stirred tank reactor, the monomer feed stream being at ambient temperature (approximately 23° C.) and consisting of 11 weight-percent (wt %) acrylonitrile, 72.5 wt % styrene and 16.5 wt % ethylbenzene, with wt % relative to total monomer feed stream weight. Add to the feed stream just prior to entering the reactor 1,1-bis-t-butylperoxycyclohexane at a concentration of 200 weight parts per million weight parts total monomer feed stream weight. Also feed into the reactor terpinolene (a chain transfer agent) at a concentration of 1000 weight parts per million weight parts total monomer stream weight. Adjust the reactor temperature to a temperature in a range of 150-165° C. Adjust the monomer feed stream rate and reactor temperature to achieve a solids level in the reactor within a range of 55-70 wt % based on weight of reactor contents as well as to control the molecular weight of the solids components. Effluent from the reactor flows into a devolatilization tank to remove diluent (ethylbenzene) and unreacted styrene and acrylonitrile and any other volatile components. Maintain pressure on the devolatilization tank at 20 millimeters of mercury or less. Recover polymer product from the devolatilization tank.

Prepare PRF(1), PRF(2) and PRF(3) using a plug flow reactor process. Provide a feed stream consisting of 9.2 wt % acrylonitrile, 75.4 wt % styrene and 15.4 wt % ethylbenzene into the inlet end of a plug flow reactor process at a continuous mass flow rate. With the feed stream provide a chemical initiator (1,1-bis-t-butylperoxycycohexane) at a concentration of 300 weight parts per million weight parts of feed stream weight and chain transfer agent (n-dodecylmercaptan) at a concentration of 650 to 920 weight-parts per million weight parts of feed stream weight.

Components progress through the plug flow reactor from an entrance to an exit. The entrance to the plug flow reactor is approximately 120° C. and the temperature along the reactor increases progressively to a temperature of 175° C. a the exit of the reactor. Approximately one third of the way along the reactor and again mid-way through the reactor add an additional feed stream consisting of 20 wt % styrene and 80 wt % acrylonitrile. Adjust the flow rate of these monomer streams to achieve the desired composition of the resulting polymer. Add an additional stream of chain transfer agent to the reactor approximately one third of the way along the reactor to control final molecular weight. Adjust the rate of chain transfer agent to control the final molecular weight as desired, typically to provide a rate of 195-270 weight parts per million weight parts of inlet feed stream.

Adjust the reactor temperature profile and total add rate of the reactor streams to achieve a final percent solids exiting the reactor so that it is in a range of 65-80 wt % of the exiting stream. Direct the reactor effluent into a devolatilization process tank to remove the diluent (ethylbenzene) and unreacted styrene and acrylonitrile, as well as any other volatile components. Maintain pressure on the devolatilization tank at ten millimeters of mercury or less. Recover the final polymer product from the devolatilization tank.

Prepare the following four polymeric foam articles that differ by their polymer matrix composition:
1. Comparative Example A: 50 wt % CSTR(1) and 50 wt % CSTR(2)
2. Example 1: 50 wt % PFR (1) and 50 wt % PFR (3)
3. Example 2: 100 wt % PFR (2)
4. Comparative Example B: a repeat of Comp Ex A.

Prepare the samples by feeding the thermoplastic polymer composition, corresponding to their polymer matrix composition, at a feed rate of 91 kilograms (200 pounds) per hour into an extruder at an initial (mixing) temperature of approximately 200° C. Feed into the extruder at the same time the following additives: barium stearate (0.01 wt %), linear low density polyethylene (0.3 wt %; DOWLEX® 2247g, DOWLEX is a trademark of The Dow Chemical Company), talc (0.004 wt %), Saytex® HP-900 brand hexabromocyclododecane (0.77 wt %; Saytex is a trademark of Albemarle Corp.), AND Araldite® ECN1280 ortho-cresol novolac epoxy resin (0.11 wt %; Araldite is a trademark of Huntsman Advanced Materials Americas Inc.) where wt % is relative to total thermoplastic polymer composition weight.

Introduce a blowing agent to form a foamable polymer composition, the blowing agent consisting of 6 wt % 1,1-difluoroethane and 1.2 wt % water where wt % is relative to total thermoplastic polymer composition weight.

Cool the foamable polymer composition to a temperature of 126° C. Extrude the cooled foamable polymer composition through a slit die having a slit width of 3.175 centimeters (1.25 inches) into atmospheric pressure (approximately 760 millimeters of mercury) and allow to expand into a thermoplastic polymeric foam article having a cross sectional area of 97+/−5 cm$^2$.

Table 2 reports the properties of the resulting samples:

TABLE 2

| Sample | Cross Sectional area (cm$^2$) | Average Vertical Cell Size (mm) | Density without skins (kg/m$^3$) | CTI |
|---|---|---|---|---|
| Comp Ex A | 99 | 2.23 | 1.9 | 0.54 |
| Ex 1 | 91 | 2.02 | 1.9 | 0.87 |
| Ex 2 | 101 | 1.9 | 1.9 | 0.87 |
| Comp Ex B | 95 | 2.12 | 1.9 | 0.30 |

The polymeric foam articles prepared with SAN copolymer from a PFR reaction (Ex 1 and Ex 2) and that have an AN dimer content below 145 ppm and an AN trimer content below 8,500 ppm are noticeably less yellow than foam prepared using an SAN copolymer from a CSTR reaction process (Comp Ex A and Comp Ex B) with higher oligomer concentrations. None of the polymeric foam articles contain dicarboxylic anhydride monomers and none of the SAN copolymers were produced in the presence of antioxidants.

All samples contain the same amount of antioxidant stabilizer, yet surprisingly the samples with low dimer and trimer (Exs 1 and 2) are dramatically less yellow. Preparing the SAN copolymer using the PFR process surprisingly produces SAN copolymer with less AN dimer and trimer, which in turn is useful to prepare polymeric foam having a surprisingly whiter appearance—even when the average cell size is in excess of one millimeter.

The invention claimed is:

1. A process for preparing a polymeric foam article, the process comprising:
   a. preparing a foamable polymer composition that comprises a blowing agent and a polymer matrix that includes styrene-acrylonitrile copolymer, the foamable polymer composition being at an initial temperature higher than the softening temperature of the polymer matrix and an initial pressure that precludes foaming of the polymer matrix; and
   b. exposing the foamable polymer composition to a pressure below the initial pressure and allowing the polymer matrix to expand into a polymeric foam article;

wherein, styrene-acrylonitrile accounts for at least 50 weight-percent of the polymer matrix relative to polymer matrix weight and wherein the polymer matrix contains less than 145 weight parts acrylonitrile dimer and less than 8,500 weight-parts acrylonitrile trimer based on one million weight parts of polymer matrix and wherein polymerized acrylonitrile monomer makes up less than 20 weight-percent and five weight-percent or more of the total weight of styrene-acrylonitrile copolymer and wherein the process further includes preparing the styrene-acrylonitrile copolymer by polymerizing the styrene-acrylonitrile copolymer in a plug-flow reactor and directly thereafter removing volatile components, and then using the styrene-acrylonitrile copolymer as obtained upon removing volatile components to prepare the foamable polymer composition.

2. The process of claim 1, wherein the process is an extrusion process wherein step (b) includes extruding the foamable polymer composition through a foaming die into an area having a pressure below the initial pressure after which the foamable polymer composition begins to expand into a foam.

3. The process of claim 1, wherein the step (b) includes allowing the foamable polymer composition into a polymeric foam article having a density of 40 kilograms per cubic meter or less, an average cell size of 1.3 millimeters or more, and a composite transmittance index greater than 60%.

4. The process of claim 1, wherein the polymer matrix comprising at least 75 wt % of styrene-acrylonitrile copolymer.

* * * * *